United States Patent [19]

Ruggles

[11] 4,241,375
[45] Dec. 23, 1980

[54] SEQUENTIAL IRRIGATION CONTROL SYSTEM

[75] Inventor: Richard L. Ruggles, Mount Baldy, Calif.

[73] Assignee: Clemar Manufacturing Corp., Azusa, Calif.

[21] Appl. No.: 7,889

[22] Filed: Jan. 31, 1979

[51] Int. Cl.³ .......................................... H01H 47/14
[52] U.S. Cl. ................................ 361/166; 340/167 R; 307/41; 307/154; 361/169
[58] Field of Search ...................... 361/166, 168, 169; 340/167 R, 168 A; 307/41, 154

[56] References Cited

U.S. PATENT DOCUMENTS

| | | | |
|---|---|---|---|
| 3,355,577 | 11/1967 | Heuer | 340/168 R |
| 3,449,015 | 6/1969 | Payne | 361/166 X |
| 3,469,153 | 9/1907 | Appello | 361/169 |
| 3,521,130 | 7/1970 | Davis et al. | 361/168 |
| 3,697,954 | 10/1972 | Maye | 361/169 X |
| 3,723,827 | 3/1973 | Griswold et al. | 361/166 |

OTHER PUBLICATIONS

Woolard, A. J., "Solid State Sequence Control", *Design Electronics*, vol. 8, Apr./May 1971, pp. 121, 122, 125.

Primary Examiner—J. D. Miller
Assistant Examiner—L. C. Schroeder
Attorney, Agent, or Firm—Fulwider, Patton, Rieber, Lee & Utecht

[57] ABSTRACT

A low-cost control system for irrigation valves and the like, including a station advance control unit and a plurality of valve control units connected in a series string by a pair of power supply lines from the station advance control unit, each of the valve control units being associated with a single valve or a single group of valves. When power is first applied to a valve control unit, it actuates the valve or valves with which it is associated, and blocks the flow of power to succeeding control units in the series string. When a station advance signal is transmitted along a third line connected to all of the valve control units, the most remote control unit to which power is connected responds by deactuating its valve or valves, and switching power through to the next unit in turn. The station advance control unit generates station advance signals to control a watering sequence, and automatically disconnects power from the valve control units upon the transmission of a further station advance control signal after the last valve or valves in the series string have been actuated.

10 Claims, 3 Drawing Figures

SEQUENTIAL IRRIGATION CONTROL SYSTEM

BACKGROUND OF THE INVENTION

The present invention relates generally to irrigation control system and, more particularly, to sequential irrigation control systems in which water valves are actuated one at a time and in a predefined sequence.

In a typical, relatively small irrigatin system, many sprinklers are supplied from a single water supply line, and only a single sprinkler, or group of sprinklers, is actuated at a time. In a normal watering sequence, the sprinkler or sprinklers at a first valve station are turned on for a predetermined time, then the sprinkler or sprinklers at the next valve station are turned on for a different predetermined time, and so on, until an entire watering cycle has been completed. There are, of course, many control systems, some of which are quite complex, for initiating and timing such a watering sequence. Such systems usually require a relatively expensive central timing mechanism, which communicates with a plurality of valve stations, either by many pairs of conductors or by means of encoded control signals transmitted over two or three conductors. In any event, such systems are quite costly, and are therefore unsuited for such applications as residential irrigation.

One alternative to a complex central timing device is exemplified by U.S. Pat. No. 3,989,066 to Sturman et al., wherein a separate timing unit is employed at each valve station, and the valve stations are connected by a pair of lines in a series string. The first valve in the string is actuated for its preselected time, after which it automatically switches power to the next valve in turn, which then remains actuated for its preselected time, and so on. In another system of the prior art, described in U.S. Pat. 3,723,827 to Griswold et al., a central timer is used, and power is supplied over a pair of lines to a series string of valve control units, the power being switched from one unit to the next in response to short interruptions in the operating voltage supplied at the central site. Another system, described in U.S. Pat. No. 3,113,724 to De Bough is similar to the one described in the aforementioned Sturman et al patent, except that individual timers at the valve stations are not employed, but rather the conditions of water sensors determine the termination of watering at the stations.

Accordingly, there is still a need for a low-cost sequential irrigation controller system which is readily adaptable for control by a central timing and control unit or by manual means at the central site. The present invention is directed to this end.

SUMMARY OF THE INVENTION

The present invention resides in a sequential irrigation control system having a plurality of valve control units connected in a series string, wherein the transfer of power from one control unit to the next one in the string is effected by a momentary control signal generated at the central site. Basically, and in general terms, the system of the invention comprises a plurality of valve control units connected together by a pair of power conductors in a series string, and a station advance control unit for initiating the connection of power to the first valve control unit, and for generating station advance control signals supplied to the valve control units over a third conductor. Each of the valve control units has power input terminals and power output terminals, and comprises first switching means, responsive to the initial presence of power supply voltage on the input terminals, to supply power to a solenoid valve, and second switching means coupled to the first switching means, to prevent connection of the power supply voltage to the power output terminals of the valve control unit. The first switching means is also responsive to a momentary station advance signal, thereby disconnecting the power from the solenoid valve and immediately closing the second switching means to supply power to the output terminals and thence to the next valve control unit in the series string.

In accordance with one important aspect of the invention, the power output terminals of the last valve control unit in the string are short-circuited, and the station advance control unit includes means responsive to the detection of a short-circuit current in the power conductors, for disconnecting power supplied to the valve control units, and thereby terminating the watering sequence. The station advance control unit also includes means for generating station advance signals. The latter means may be, as in the illustrative embodiement, a manually controlled circuit, or may be a low cost programmable electronic controller.

It will be appreciated from the foregoing that the present invention represents a significant advance in the field of low-cost sequential irrigation control systems. In particular, it provides a system in which a watering sequence can be started manually or automatically and power can be switched from one valve control unit to the next in a series string by means of a centrally generated station advance signal. Other aspects and advantages of the present invention will become apparent from the following more detailed description, taken in conjunction with the accompanying drawings.

DESCRIPTION OF THE PREFERRED EMBODIMENT

Figure 1:
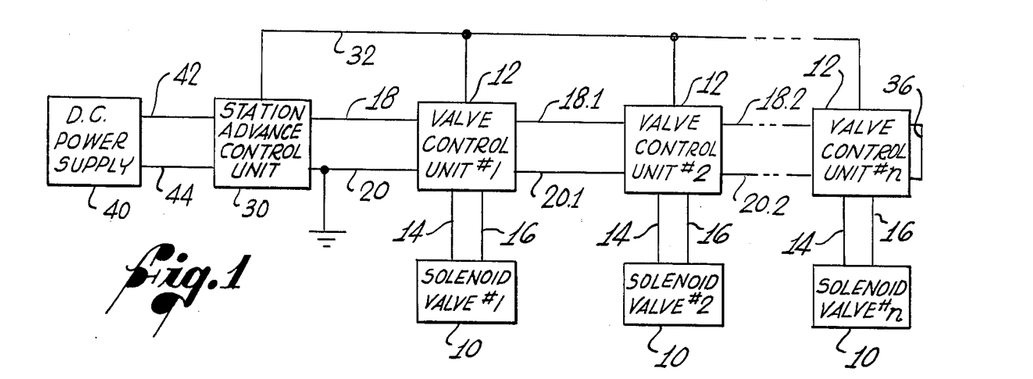
FIG. 1 is a simplified block diagram of an irrigation control system embodying the present invention.

As shown in the drawings for purposes of illustration, the present invention is concerned with sequential irrigation control systems, i.e., those in which a plurality of valves are actuated in a predetermined sequence during the course of a watering cycle. As shown in FIG. 1, a system of this type include a plurality of solenoid valves, indicated by reference numeral 10, each of which is controlled by a corresponding valve control unit 12, the valve control units supplying power to the solenoid valves over lines 14 and 16. Power is supplied to the first valve control unit over a pair of conductors, a power conductor 18 and a ground wire 20, and is transmitted from the first to the second valve control unit over lines 18.1 and 20.1, and from the second to the third valve control unit over lines 18.2 and 20.2, and so on. Each valve control unit includes means for controlling the flow of power to the next valve control unit in the series string.

In accordance with the present invention, the system is controlled by a station advance control unit 30, which supplies power over the lines 18 and 20 to the first valve control unit, and also supplies a station advance signal over line 32, a third conductor connected in common to all of the valve control units 12. When power is first applied over lines 18 and 20, valve control unit #1 switches power to its solenoid valve, but prevents power from being transmitted to valve control unit #2, the next control unit in the string. When a station advance signal is transmitted along line 32, valve control unit #1 responds by shutting off power to solenoid valve #1 and switching/power through valve control unit #1 to valve control unit #2. Valve control unit #2 then functions in exactly the same way as control unit #1 did when power was first applied to it. Solenoid valve #2 therefore remains switched on until another station advance signal is transmitted along line 32, at which time solenoid valve #2 is deactuated and solenoid valve #3 is actuated.

In this manner power is switched from control unit to control unit until all valves in the sequence have been actuated. After the last valve in the string has been actuated for its designated watering time, another station advance control signal is transmitted along line 32, and the last solenoid valve is switched off. Simultaneously, power is supplied to the output terminals of the last valve control unit, which are shorted together as indicated at 36. As will be further explained, the station advance control unit includes means for detecting a short-circuit current in the power conductors 18 and 20, and means responsive to the detection of such a short-circuit current, for disconnecting power from the lines 18 and 20, thereby terminating the watering sequence. The system also includes a dc power supply 40 of conventional design, for generating a constant voltage of, e.g., 24 volts. Output lines 42 and 44 from the power supply 40 are connected to the station advance control unit 30.

Figure 3:
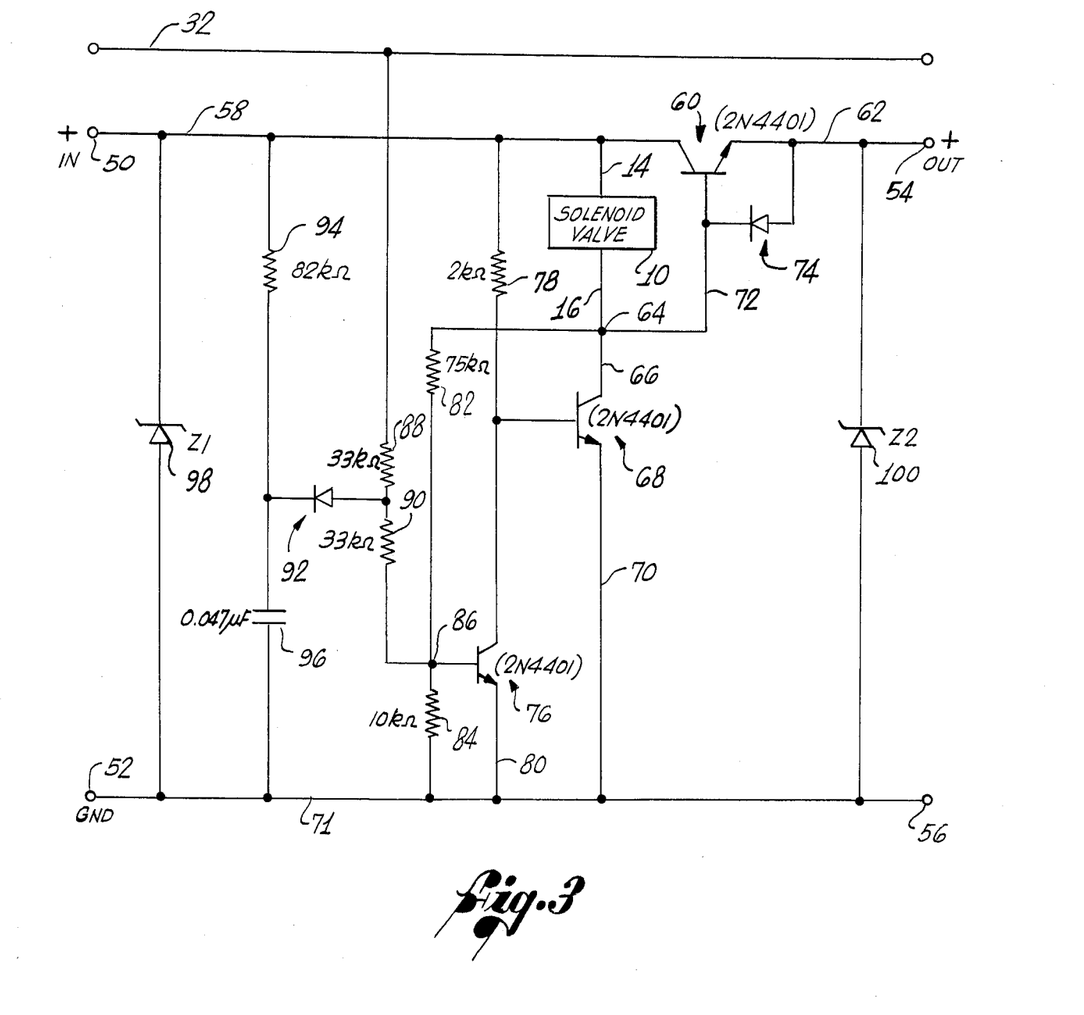
FIG. 3 is a schematic diagram of a valve control unit included in he control system of FIG. 1.

As shown in FIG. 3, each of the valve control units 12 has a pair of power input terminals 50 and 52 and a pair of power output terminals 54 and 56. The positive power input terminal 50 supplies power to a positive power bus 58 connected between the terminal 50 and the collector of an NPN transistor 60, the emitter terminal of which is connected by line 62 to the positive power output terminal 54 of the control unit. As will become clear, the transistor 60 is operative to switch power to the output terminal 54 in response to a station advance signal received over line 32. The solenoid valve 10 has one of its terminals connected by line 14 to the positive supply bus 58, and the other of its terminals connected by line 16 to a junction point 64, and thence by line 66 to the collector of another NPN transistor 68, the emitter terminal of which is connected by line 70 to a ground bus 71 between input terminal 52 and output terminal 56. It will be apparent that, when the transistor 68 is in a conductive state, the solenoid valve 10 is connected across the power supply. The base terminal of the transistor 60 is connected by line 72 to the junction point 64, and a diode 74 is connected between the emitter and base terminals of the transistor 60, with the anode of the diode being connected to the emitter.

A third NPN transistor 76 has its collector terminal connected through a resistor 78 to the positive power bus 58, and its emitter terminal connected to ground by line 80. The collector terminal of transistor 76 is also connected in series between the junction point 64 and the ground bus 71, and the junction point between these resistors, indicated at 86, is connected to the base terminal of the third transistor 76. The junction point 86 is also connected through another series pair of resistors 88 and 90 to the station advance line 32, and the junction point between the resistors 88 and 90 is connected to the anode of another diode 92. Also included is an RC circuit comprising a resistor 94 connected to the positive power bus 58 and a capacitor 96 connected to the resistor 94 and to the ground bus. The cathode terminal of the diode 92 is connected to the junction point between the resistor 94 and the capacitor 96. Finally, Zener diodes 98 and 100 are connected across the input terminals 50 and 52 and the output terminals 54 and 56 respectively.

When power is first applied to the input terminals 50 and 52, the base terminal of transistor 76 is biased to a relatively low voltage and the transistor is held in a non-conductive state. Consequently, current flows from the positive supply bus 58 through resistor 78 into the base terminal of transistor 68, which assumes a conductive state. With transistor 68 conducting, it will be apparent that the solenoid valve is energized, since it has one terminal permanently connected to the positive power supply bus 58, and its other terminal connected to ground through transistor 68. Moreover, the junction point 64 between the solenoid valve 10 and the transistor 68, will be held at essentially ground potential, thereby biasing the transistor 60, through line 72, to a non-conductive condition. Since transistor 60 is coupled between the positive input and output terminals 50 and 54, no power can flow through the control unit when transistor 60 is non-conductive. Furthermore, since the junction point 64 is tied, through resistor 82, to the base terminal of transistor 76, this transistor will be maintained in the non-conductive state, thereby ensuring that transistor 68 is held in the conductive state to keep the solenoid valve energized.

The voltage on the station advance line 32 is normally at ground, and rises momentarily to a positive level when a station advance signal is generated by the station advance control unit 30 (FIG. 1). Basically, the effect of such a positive pulse on line 32 is to raise the bias voltage on the base terminal of the transistor 76 momentarily, thereby switching the transistor on, which has the effect of removing the turn-on current applied to the base terminal of transistor 68, thereby switching it off and de-energizing the solenoid valve 10. When transistor 68 is non-conductive, the voltage at its collector terminal (juntion 64) rises rapidly to a value approximating the voltage on the positive supply bus 58. This voltage, in turn, generates a current through resistor 82 into the base terminal of transistor 76, ensuring that transistor 76 remains switched on. Moreover, as the voltage at the junction 64 rises, the base terminal of transistor 60 is also biased positively, and transistor 60 is switched on, thereby connecting power to the output terminal 54 at the same time that the solenoid valve 10 is de-energized.

The function of the network comprising resistor 94, capacitor 96 and diode 92 is to prevent the solenoid valve 10 from being immediately de-energized as a result of a station advance signal intended for the preceding valve control unit in the sequenct. It has been seen that the leading edge of a station advance pulse on line 32 has the effect of de-energizing the currently energized solenoid valve and switching power to the next control unit. However, a station advance signal of long enough duration could have the effect of immediately switching on transistor 76 in the next control unit, and thereby immediately deenergizing the solenoid cific embodiment of the invention has been described in detail for purposes of illustration, various modifications may be made without departing from the spirit and scope of the invention. Accordingly, the invention is not to be limited except as by the appended claims.

I claim:

1. A sequential irrigation control system comprising:
a plurality of valve control units connectable to corresponding valves, each of said control units having power input terminals, power output terminals, and a station advance terminal, said valve control units being connected in a series string;
central control means for supplying power to the first of said valve control units, and for transmitting station advance control signals to said valve control units; and
switching means included in each of said valve control units, said switching means being responsive to the initial presence of power at said input power terminals, to actuate a valve and to block connection of power to said output terminals, and responsive to a station advance control signal to deactuate the valve and connect power to said output terminals, whereby power is switched from valve control unit to valve control unit along the series string of said units, in response to a sequence of station advance control signals;
and wherein said switching means in each of said valve control units includes
first switching means closeable in response to the initial presence of power at said input terminals to connect power to a valve, and
second switching means coupled with said first switching means, to block transmission of power to said output terminals by remaining open as long as said first switching means is closed,
and wherein said first switching means is opened and remains open in response to a momentary station advance control signal, thereby disconnecting power from the valve and connecting it to said output terminals.

2. A sequential irrigation control system as set forth in claim 1, wherein said central control means includes means for generating station advance control signals in response to the condition of a manually operable switch.

3. A sequential irrigation control system comprising:
a central control unit for supplying power over a pair of power lines and for generating station advance control signals on a separate control signal line;
a plurality of valve control units each having a pair of input power terminals, a pair of output power terminals, a pair of valve power supply terminals, and a station advance control terminal, wherein said valve control units are connected in a series string, with the station advance control terminals being connected to the control signal line, and the output power terminals of each of said valve control units except the last being connected to the input terminals of the next of said valve control units in the string;
a plurality of irrigation valves connected to said valve power supply terminals; and
switching means included in each of said valve control units, responsive to the initial application of power to said input power terminals, to switch power to said valve power supply terminals and to prevent power from being transmitted to said output terminals, and responsive to a momentary signal on said control signal line, to switch power to said output terminals and to prevent power from being transmitted to said valve power supply terminals;
whereby power is connected initially to said valve power supply terminals of the first of said valve control units, and is switched to valve power supply terminals of successive valve control units upon the occurrence of successive station advance control signals;
and wherein each of said switching means includes
first switching circuit operable to connect power to said valve power supply terminals when in a conductive state,
a second switching circuit operable to connect power to said output terminals when in the conductive state, and being coupled to said first switching circuit in such a manner that said second circuit is in the conductive state only when said first circuit is in the non-conductive state,
a third switching circuit operable to bias said first switching circuit into a conductive state when power is first applied to said input terminals, and to bias said first switching circuit into a non-conductive state upon the occurrence of a station advance signal, and
latching circuit means for maintaining said first circuit in the non-conductive state after the occurrence of said station advance signal and until removal of power from said input power terminals.

4. For use in a sequential irrigation control system having a central control unit for supplying power over a pair of power lines and for generating station advance control signals on a control signal line, a valve control unit comprising:
a pair of input power terminals;
a pair of output power terminals;
a pair of valve power supply terminals for connection to at least one irrigation valve;
a station advance control terminal; and
switching means responsive to an initial application of power to said input power terminals, to switch power to said valve power supply terminals and to prevent power from being transmitted to said output terminals, and responsive to a momentary signal on said station advance control terminals, to switch power to said output terminals and to prevent power from being transmitted to said valve power supply terminals;
whereby power applied to said power input terminals is switched initially to said valve power supply terminals, and subsequently to said power output terminals, upon the occurrence of a momentary signal at said station advance control terminal;
and wherein said switching means includes
a first switching circuit operable to connect power to said valve power supply terminals when in a conductive state,
a second switching circuit operable to connect power to said output signal terminals when in the conductive state, and being coupled to said first switching circuit in such a manner that said second circuit is in the conductive state only when said first circuit is in the non-conductive state,
a third switching circuit operable to bias said first switching circuit into a conductive state when valve that had just been energized. The resistor 94 and capacitor 96 provide a time delay, and it will be appreciated that the junction between these two components will be initially at ground potential when power is first applied to the input terminal 50. Consequently, when power is first applied to a control unit, the station advance signal on line 32 will be short-circuited through the diode 92 and the capacitor 96, and will have no effect on the operation of the transistor 76. After the capacitor 96 has charged up fully and the junction between capacitor 96 and resistor 94 is at the positive power potential, a subsequent line advance signal on line 32 will not be conducted through the diode 92, and will have the intended effect of switching on transistor 76 and switching off transistor 68 and the solenoid valve 10. Clearly, the values of the resistor 94 and capacitor 96 must be chosen to give a capacitor charging time which is significantly greater than the duration of the station advance pulse.

The Zeners 98 and 100 are intended to protect the transistors in the event of inadvertent misconnection of the power lines, and also to provide protection against transient voltages generated during switching of the solenoid valves 10.

Figure 2:
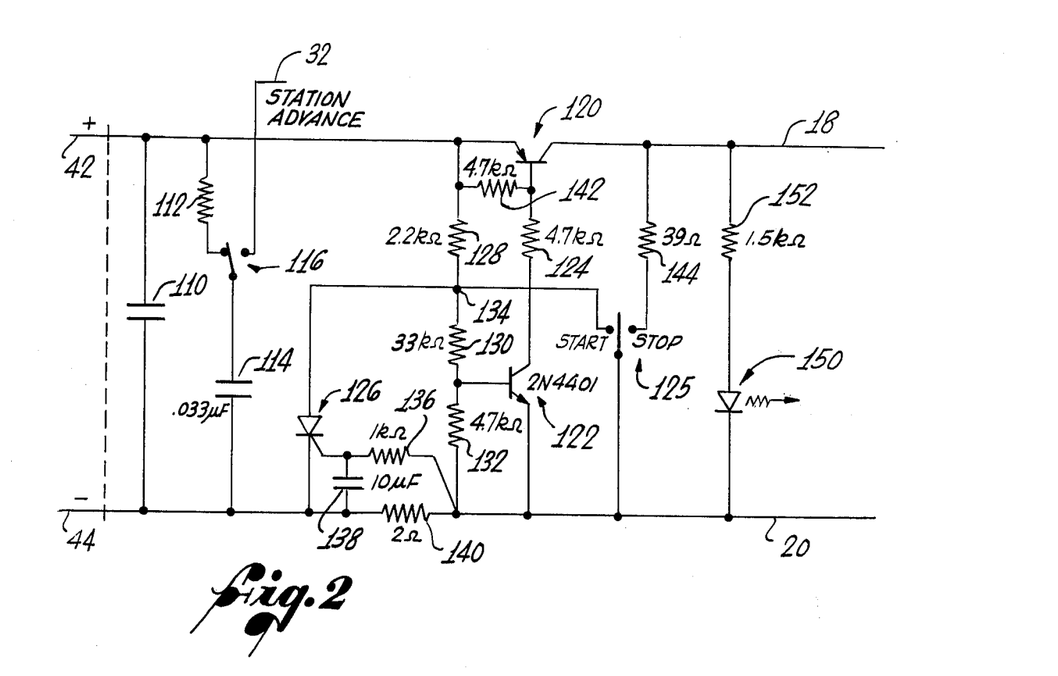
FIG. 2 is a schematic diagram of the station advance control unit included in the control system of FIG. 1.

Although the station advance control unit 30 (FIG. 1) could take the form of an electric timing device, which could be programmable in terms of the cycle start times and watering times of the valves, in its simplest form the control unit 30 can be manually operated, as illustrated in FIG. 2. Connected across the power input lines 42 and 44 is a capacitor 110, for filtering purposes, and a resistor 112 and capacitor 114 connectable in series by a single-pole double-throw switch 116. The resistor 112 is connected between one fixed contact of the switch 116 and the positive input line 42, and the capacitor 114 is connected between the movable contact of the switch and ground. The station advance line is connected to the other fixed contact of the switch 116.

The switch 116 is normally spring biased into the position connecting the resistor and capacitor in series, and may be momentarily actuated to connect the station advance line 32 to the capacitor. Consequently, with the switch 116 in its normal position the capacitor 114 is charged through the resistor 112. When the switch 116 is actuated, the capacitor 114 is discharged through station advance line 32, to switch control from one valve control unit to the next.

The power input line 42 is connected to the emitter of a PNP transistor 120, the collector of which is connected to the power output line 18, so that, when transistor 120 is in a conductive state, power is propagated along line 18 to one or more of the valve control units 12. The remainder of the circuitry of the station advance control unit 30 is concerned with manual and automatic means for switching the transistor 120, to control initiation and termination of a sequence of valve operations. The circuitry to accomplish this includes an NPN transistor 122 having its emitter connected to the output ground line 20 and its collector connected through a resistor 124 to the base terminal of the transistor 120, and also includes a three-position switch 125, referred to as the start/stop switch, and a silicon controlled rectifier (SCR) 126. The circuitry also includes a resistive voltage divider comprising three resistors 128, 130 and 132 connected in series between the positive power supply line 42 and the ground output line 20. The resistor 128 is connected to the positive supply power line 42 and to resistor 130, as indicated at junction 134, and resistor 130 is connected to resistor 132, which is, in turn, connected to the output ground line 20. The base terminal of NPN transistor 122 is connected to the junction point between resistors 130 and 132. The cathode terminal of the SCR 126 is connected to the negative input power line 44, the anode terminal is connected to the junction point 134 of the voltage divider, and the gate terminal is connected through a resistor 136 to the output ground line 20, and also through a capacitor 138 to the negative input power line 44. The negative input power line 44 is connected to the output ground line through a small resistor 140. Another resistor 142 is connected between the emitter and base terminals of the power line transistor 120, and a further resistor 144 is connected between the output power line 18 and one fixed terminal, the "stop" terminal of the start/stop switch 125. The other fixed terminal, the "start" terminal, is connected to the junction point 134, and the movable contact is connected to the output ground line 20.

When power is first supplied to the station advance control unit 30, the base terminal of transistor 122 is biased such that the transistor will be initially in a conductive state. This, in turn, ensures that transistor 120 will also be in a conductive state, thereby initially connecting power to the output power line 18. The watering sequence will then begin as already described, and solenoid valve #1 will be first energized, and then solenoid valve #2, and so on.

At the end of the watering sequence the power line will be shorted to ground, as indicated at 36 (FIG. 1), and the resultant flow of current in the ground line 20 will produce a substantial voltage drop across the small resistor 140. This voltage drop is impressed on the gate terminal of the SCR 126, thereby causing the SCR to begin conducting, and essentially grounding the junction point 134. It will be apparent that, when the SCR 126 is in a conductive state, transistor 122 will be biased into the cutoff region and will cease conducting. Consequently, transistor 120 will also be switched off, and power will be disconnected from the positive output power line 18.

The same effect, i.e., disconnection of power, can be obtained by moving the start/stop switch 125 to the stop position, and thereby shorting the positive power line 18 through resistor 144 to ground. Again, this creates a voltage drop across the small resistor 140, fires the SCR 126, and opens both transistors 122 and 120. Once a watering cycle has been stopped in this manner, either on completion of the cycle or by means of the start/stop switch 125, it may be restarted by moving the start/stop switch to the start position. In the start position, the switch 125 connects the anode and cathode terminals of the SCR 126 together, thereby switching the SCR off and allowing transistors 122 and 120 to assume the conductive state again.

For convenience, the station advance control unit 30 also includes a light emitting diode 150 connected in series with a resistor 152 between the output power line 18 and the output ground line 20, to indicate when power is being supplied to the valve control units 12.

It will be appreciated from the foregoing that the present invention provides a significant advance in the field of low cost irrigation control systems. In particular, it provides a system for energizing a sequence of solenoid valves by means of an advance signal generated at a central location, either by manual or automatic means. It will also be appreciated that, although a spepower is first applied to said input terminals, and to bias said first switching circuit into a non-conductive state upon the occurrence of a station advance signal, and latching circuit means for maintaining said first switching circuit in the non-conductive state after the occurrence of said station advance signal and until removal of power from said input power terminals.

5. A sequential irrigation control system comprising:
a plurality of valve control units connectable to corresponding valves, each of said control units having power input terminals and power output terminals, and said valve control units being connected in a series string;
central control means for supplying power to the first of said valve control units, and for transmitting station advance control signals to said valve control units; and
switching means included in each of said valve control units, said switching means being responsive to the initial presence of power at said input power terminals, to actuate a valve and to block connection of power to said output terminals, and responsive to a station advance control signal to deactuate the valve and connect power to said output terminals, whereby power is switched from valve control unit to valve control unit along the series string of said units, in response to a sequence of station advance control signals
and wherein
said output terminals of the last of said valve control units are coupled together, and
said central control means includes means for detecting an overcurrent condition caused by switching of power to said coupled output terminals, and means for terminating an irrigation sequence by disconnecting power from the first of said valve control units in response to detection of said overcurrent condition.

6. A sequential irrigation control system comprising:
a plurality of valve control units connectable to corresponding valves, each of said control units having power input terminals and power output terminals, and said valve control units being connected in a series string;
central control means for supplying power to the first of said valve control units, and for transmitting station advance control signals to said valve control units; and
switching means included in each of said valve control units, said switching means being responsive to the initial presence of power at said input power terminals, to actuate a valve and to block connection of power to said output terminals, and responsive to a station advance control signal to deactuate the valve and connect power to said output terminals, whereby power is switched from valve control unit to valve control unit along the series string of said units, in response to a sequence of station advance control signals;
and wherein said central control means includes means for generating station advance control signals in response to the condition of a manually operable switch, and means for manually terminating and re-initiating an irrigation sequence.

7. A sequential irrigation control system comprising:
a central control unit for supplying power over a pair of power lines and for generating station advance control signals on a control signal line;
a plurality of valve control units each having a pair of input power terminals, a pair of output power terminals, a pair of valve power supply terminals, and a station advance control terminal, wherein said valve control units are connected in a series string, with the output power terminals of each of said valve control units except the last being connected to the input terminals of the next of said valve control units in the string;
a plurality of irrigation valves connected to said valve power supply terminals; and
switching means included in each of said valve control units, responsive to the initial application of power to said input power terminals, to switch power to said valve power supply terminals and to prevent power from being transmitted to said output terminals, and responsive to a momentary signal on said control signal line, to switch power to said output terminals and to prevent power from being transmitted to said valve power supply terminals;
whereby power is connected initially to said valve power supply terminals of the first of said valve control units, and is switched to valve power supply teminals of successive valve control units upon the occurrence of successive station advance control signals;
and wherein each of said switching means includes
a first transistor switching circuit operable to connect power to said valve power supply terminals when in a conductive state,
a second transistor circuit operable to connect power to said output terminals when in the conductive state, and being coupled to said first transistor circuit in such a manner that said second circuit is in the conductive state only when said first circuit is in the non-conductive state,
a third transistor circuit operable to bias said first transistor circuit into a conductive state when power is first applied to said input terminals, and to bias said first transistor circuit into a non-conductive state upon the occurrence of a station advance signal,
latching circuit means for maintaining said first circuit means in the non-conductive state after the occurrence of said station advance signal and until removal of power from said input power terminals, and
station advance signal discrimination means, for nullifying the effect of a station advance control signal on said third transistor circuit means for a predetermined time following the first application of power to said input power terminals, whereby a station advance control signal of relatively long duration will not have the effect of switching power from a valve control unit to which power has just been applied.

8. A sequential irrigation control system comprising:
a central control unit for supplying power over a pair of power lines and for generating station advance control signals on a control signal line;
a plurality of valve control units each having a pair of input power terminals, a pair of output power terminals, a pair of valve power supply terminals, and a station advance control terminal, wherein said valve control units are connected in a series string, with the output power terminals of each of said valve control units except the last being connected to the input terminals of the next of said valve control urits in the string;

a plurality of irrigation valves connected to said valve power supply terminals; and switching means included in each of said valve control units, responsive to the initial application of power to said input power terminals, to switch power to said valve power supply terminals and to prevent power from being transmitted to said output terminals, and responsive to a momentary signal on said control signal line, to switch power to said output terminals and to prevent power from being transmitted to said valve power supply terminals;

whereby power is connected initially to said valve power supply terminals of the first of said valve control units, and is switched to valve power supply terminals of successive valve control units upon the occurrence of successive station advance control signals;

and wherein said power output terminals of the last of said valve control units in the series string are coupled together, and said central control unit includes means for detecting an overcurrent condition caused by the switching of power to said coupled output terminals, and means responsive to the detection of such an overcurrent condition, for automatically disconnecting power from said valve control units on completion of an irrigation sequence.

9. For use in a sequential irrigation control system having a central control unit for supplying power over a pair of power lines and for generating station advance control signals on a control signal line, a valve control unit comprising:

a pair of input power terminals;

a pair of output terminals;

a pair of valve power supply terminals for connection to at least one irrigation valve;

a station advance control terminal; and switching means responsive to an initial application of power to said input power terminals, to switch power to said valve power supply terminals and to prevent power from being transmitted to said output terminals, and responsive to a momentary signal on said station advance control terminals, to switch power to said output terminals and to prevent power from being transmitted to said valve power supply terminals;

whereby power applied to said power input terminals is switched initially to said valve power supply terminals, and subsequently to said power output terminals, upon the occurrence of a momentary signal at said station advance control terminal;

and wherein said switching means includes a first transistor switching circuit operable to connect power to said valve power supply terminals when in a conductive state, a second transistor circuit operable to connect power to said output terminals when in the conductive state, and being coupled to said first transistor circuit in such a manner that said second circuit is in the conductive state only when said first circuit is in the non-conductive state, a third transistor circuit operable to bias said first transistor circuit into a conductive state when power is first applied to said input terminals, and to bias said first transistor circuit into a non-conductive state when power is first applied to said input terminals, and to bias said first transistor circuit into a non-conductive state upon the occurrence of a station advance signal, and latching circuit means for maintaining said first circuit means in the non-conductive state after the occurrence of said station advance signal and until removal of power from said input power terminals.

10. A valve control unit as set forth in claim 9, wherein said switching means further includes:

station advance signal discrimination means, for nullifying the effect of a station advance control signal on said third transistor circuit means for a predetermined time following the first application of power to said input power terminals, whereby a station advance control signal of relatively long duration will not have the effect of switching power from said valve control unit to which power has just been applied.

* * * * *

UNITED STATES PATENT AND TRADEMARK OFFICE
CERTIFICATE OF CORRECTION

PATENT NO. : 4,241,375

DATED : December 23, 1980

INVENTOR(S) : Richard L. Ruggles

It is certified that error appears in the above—identified patent and that said Letters Patent is hereby corrected as shown below:

Column 2, line 44, delete "he" and insert therefor -- the --;

line 53, delete "include" and insert therefor -- includes --.

Column 3, line 65, after "connected" insert -- to the base of the second transistor 68. A pair of resistors 82 and 84 are connected --.

Column 4, line 61, delete "sequenct" and insert therefor -- sequence --;

line 65, after the word "next" insert the word -- valve --.

UNITED STATES PATENT AND TRADEMARK OFFICE
CERTIFICATE OF CORRECTION

PATENT NO. : 4,241,375

DATED : December 23, 1980

INVENTOR(S) : Richard L. Ruggles

It is certified that error appears in the above—identified patent and that said Letters Patent is hereby corrected as shown below:

Column 5, line 26, delete "electric" and insert therefor -- electronic --.

Column 10, line 8, delete "unfts" and insert therefor -- units --.

Column 11, line 5, delete "urits" and insert therefor -- units --;

line 40, after "output" insert the word -- power --.

Signed and Sealed this

Nineteenth Day of May 1981

[SEAL]

*Attest:*

RENE D. TEGTMEYER

*Attesting Officer*     *Acting Commissioner of Patents and Trademarks*